UNITED STATES PATENT OFFICE.

ADOLPH FRANK, OF CHARLOTTENBURG, GERMANY.

METHOD OF PRODUCING HYDROGEN FROM WATER-GAS.

964,415. Specification of Letters Patent. Patented July 12, 1910.

No Drawing. Original application filed November 15, 1906, Serial No. 343,522. Divided and this application filed May 6, 1907. Serial No. 372,236.

*To all whom it may concern:*

Be it known that I, ADOLPH FRANK, a subject of the King of Prussia, residing at 26 Berlinerstrasse, Charlottenburg, Germany, have invented certain new and useful Improvements in Methods of Producing Hydrogen from Water-Gas; and I do hereby declare the following to be a full, clear, and exact description of the invention.

The present invention has for its object a method of producing practically pure hydrogen from water-gas.

The production of practically pure hydrogen from water-gas or similar mixtures of hydrogen, nitrogen, carbonic acid, carbon monoxid, etc., was not possible hitherto to an extensive extent.

Water-gas obtained on a large scale represents a quantity of hydrogen and carbon monoxid, besides some carbonic acid and nitrogen, and small quantities of hydrocarbons, for example methane $CH_4$ and to obtain practically pure hydrogen from this mixture was connected with such great difficulties that it could not be generally introduced in the technics.

Now an important object of the present invention is to absorb the compounds which in addition to hydrogen are in water-gas in one operation or in two operations following one after another, with the result that almost chemically pure hydrogen is obtained as the final product. For this purpose water-gas which is previously dried as much as possible is conducted over carbid, *e. g.* calcium carbid, at a temperature from 300° C. up to the melting point of the carbid. The calcium carbid may be pure or be mixed with other carbids, or with other inert materials which promote the absorption, or with such as reduce the temperature of absorption. Such absorption is not of a mechanical or physical nature but is a chemical one, as hereinafter more fully explained. When water-gas is conducted over carbid thus heated, an absorption of all the intermixtures with the hydrogen takes place. Carbon monoxid or carbonic acid forms with the carbid, lime or carbonate of lime and carbon. The nitrogen is likewise absorbed. The hydro-carbons are decomposed when passing over the heated lime-carbon material with the separation of carbon. The action of the carbid on the various gases mentioned is indicated in the following reactions.

$CO + CaC_2 = CaO + 3C$
$CO_2 + 2CaC_2 = 2CaO + 5C$
$3CO_2 + 2CaC_2 = 2CaCO_3 + 5C$
$O + CaC_2 = CaO + 2C$
$2N + CaC_2 = CaN_2C + C$
$CH_4 + heat = 4H + C$
$SiH_4 + 3CO + CaC_2 + heat = CaSiO_3 + 3C + 4H$
$CS_2 + CaC_2 = 2CaS + 3C$
$H_2S + CaC_2 = CaS + C_2 + H_2$
$xPH_3 + CaC_2 = CaP_x + C_2 + H_{3x}$
$CS_2 + 2CO_2 + heat = 2SO_2 + 3C$
$2SO_2 + 3C + 2CaC_2 = CaSO_3 + CaS + 7C$ Almost chemically pure hydrogen is ultimately obtained as the final product.

The reaction may also be so conducted that carbonic acid or carbon monoxid is previously entirely or partially removed from the water-gas by mechanical separation of the constituent gases as hereinafter more fully explained in order to relieve the carbid from the duty of separating the major part of the gases and in this manner a mixture which is rich in hydrogen is in the first place produced which, as stated above, is submitted to the action of carbid. The said previous purification of the water-gas may be carried out in various ways. If the water-gas is produced at a high furnace-temperature, so that the same contains in addition to water-gas almost exclusively carbon monoxid and only little carbonic acid, the mechanical separation is preferably effected by conducting the water-gas, which has been suitably cooled, into a Linde's air-liquefaction machine, or other similarly constructed apparatus. In this manner a mechanical separation takes place, the carbon monoxid being liquefied, the carbonic acid and small quantities of silicon-hydrogen etc., being obtained solid, whereas the hydrogen remains gaseous and can be separated and conducted away. The previous mechanical separation may also be carried out so that the hydrogen is completely liquefied, the hydrogen being obtained by fractional distillation from the liquid which is thus obtained. If the water-gas is produced at a low temperature, and if little carbon monoxid and principally carbonic acid are obtained in addition to hydrogen, the previous mechanical separation may also be preferably effected by the water-gas being cooled down to a temperature below that of the congealing or liquefying point of the secondary constituents of the water-gas (carbonic acid, carbon monoxid, etc.), these secondary constituents being separated in this manner in a solid or liquid form from the hydrogen which is obtained. After the previous mechanical separation of the secondary gases, as above described the hydrogen which contains some remnant of other gases as CO, $CO_2$, $SiH_4$, $H_2S$, $PH_3$, N, $CS_2$, and hydrocarbons, is then subjected to a final purification by conducting it over carbid in the manner above described.

I claim:

1. A method of producing practically pure hydrogen, which consists in mechanically separating carbon di-oxid, carbon monoxid and other secondary gases from the water gas and then passing the residual gas mixture containing some of said secondary gases over heated carbid.

2. The method of producing pure hydrogen, which comprises first mechanically and incompletely separating carbon di-oxid and other secondary gases from water gas and then passing the residual gas mixture, from which the secondary gases have not been completely removed, over carbid heated to a temperature sufficient to react with the secondary gases remaining in said mixture, thereby obtaining pure hydrogen.

In testimony whereof I have signed my name to this specification, in the presence of two subscribing witnesses.

ADOLPH FRANK.

Witnesses:
HENRY HASPER,
WOLDEMAR HAUPT.